United States Patent [19]

Lee et al.

[11] Patent Number: 5,317,991
[45] Date of Patent: Jun. 7, 1994

[54] DOUBLE-LAYER AQUARIUM WITH FLUCTUATING WATER LEVELS

[75] Inventors: Wen-See Lee, Hsin Chu Hsien; Wen-Long Che, Hsin Chu City, both of Taiwan

[73] Assignee: Chin-Mu Hsieh, Taiwan

[21] Appl. No.: 123,429

[22] Filed: Sep. 17, 1993

[51] Int. Cl.$^5$ ............................................. A01K 63/00
[52] U.S. Cl. .................................................... 119/249
[58] Field of Search ............... 119/247, 248, 249, 250, 119/251, 253, 254, 265; 47/69; 43/54.1, 55, 56; D30/101, 102, 103, 104, 105, 106, 107

[56] References Cited

U.S. PATENT DOCUMENTS

| | | | |
|---|---|---|---|
| 4,188,909 | 2/1980 | Spivak | 119/251 |
| 5,009,188 | 4/1991 | Yasui | 119/253 |

*Primary Examiner*—Thomas Price
*Attorney, Agent, or Firm*—Stoel Rives Boley Jones & Grey

[57] ABSTRACT

An aquarium includes a lower hollow body which defines a lower chamber and an upper hollow body which defines an upper chamber. A mount plate is removably mounted in a bottom of the lower chamber and a waterproof housing is provided on the mount plate to receive a pump therein. The upper hollow body includes a plate and a housing projecting upward from the plate to define the upper chamber. A water inlet is formed in the plate beyond the housing, through which water is inputted into the lower chamber. An air passage is formed in an upper wall of the housing. A float is movably provided to the housing to block the air passage for isolating the upper chamber unless the float is raised. A protrusion projects upward from the upper wall of the housing, defining a cavity above the upper chamber. An inlet pipe has a lower end attached to the pump and an upper end extending into the cavity defined by the protrusion, preventing water from entering into the inlet pipe. Air generated by the pump is released into water in the aquarium via an outlet pipe.

1 Claim, 4 Drawing Sheets

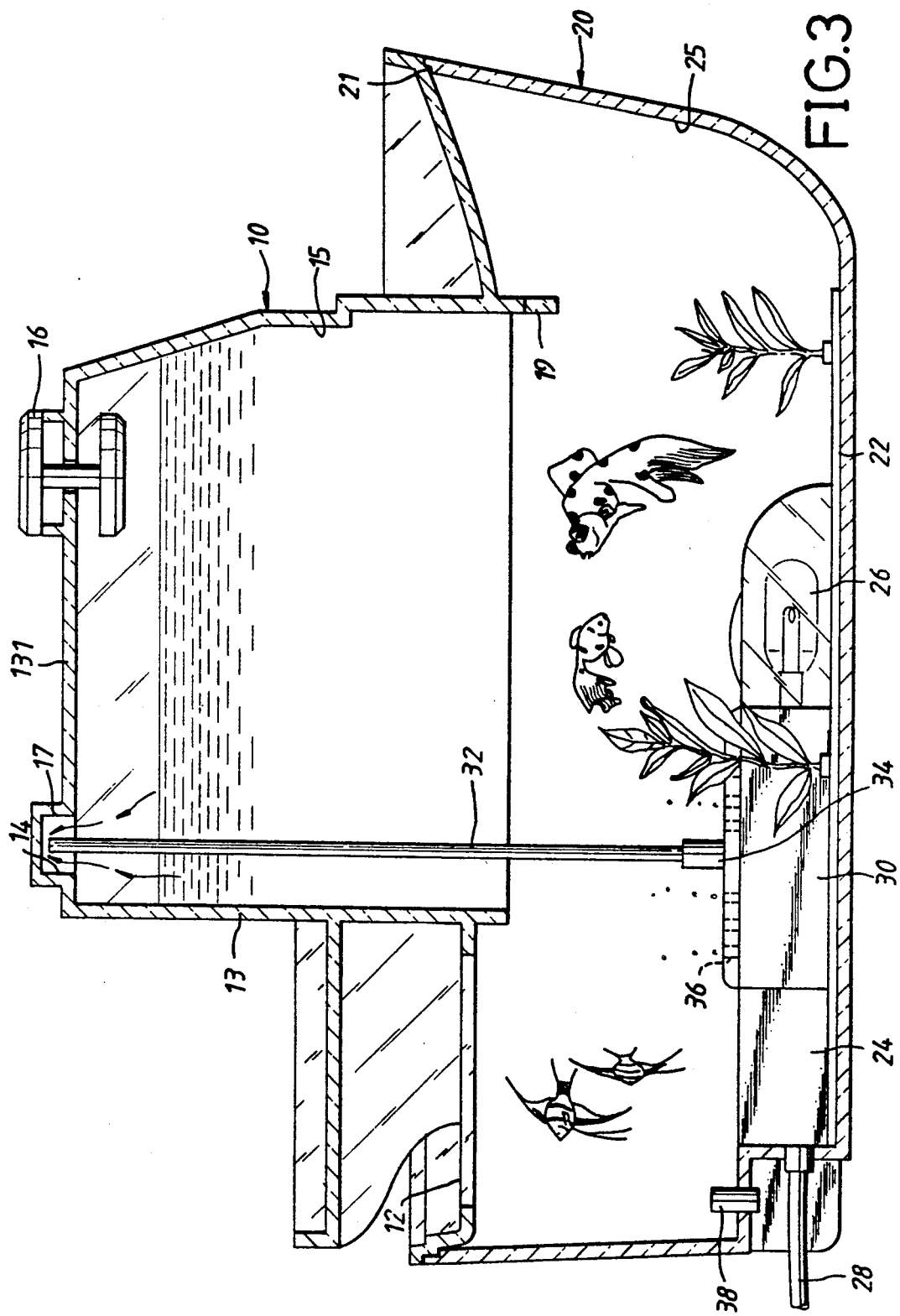

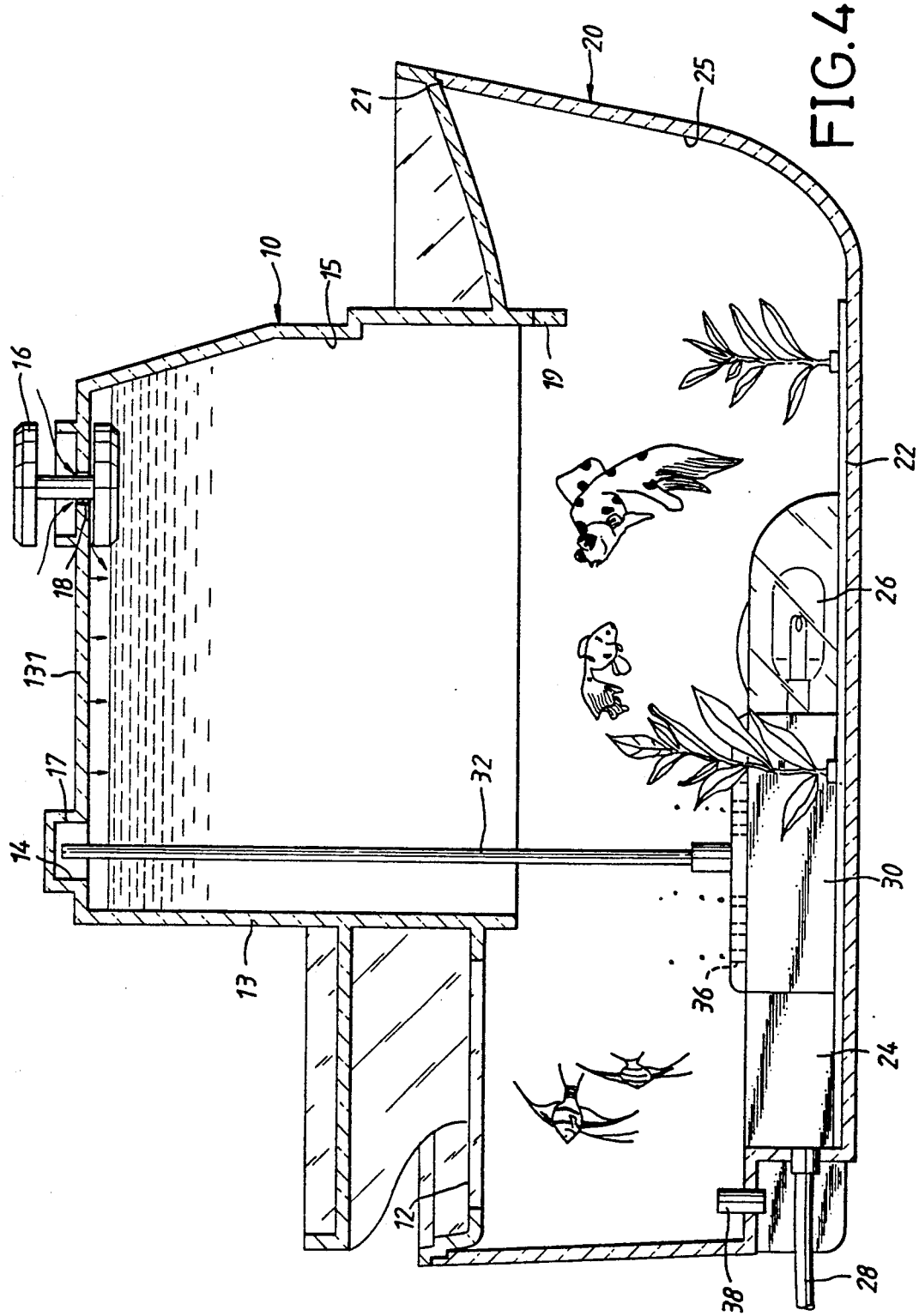

DOUBLE-LAYER AQUARIUM WITH FLUCTUATING WATER LEVELS

BACKGROUND OF THE INVENTION

1. Field of the Invention

The present invention relates to a double-layer aquarium with fluctuating water levels to provide an aesthetic design for viewing purpose.

2. Description of Related Art

Multi-layer aquariums have been developed in addition to modifications in the shapes and/or internal arrangement to improve viewing effect. The present invention intends to provide a novel double-layer aquarium which utilizes atmospheric pressure to allow fluctuation of the water levels for viewing purpose.

SUMMARY OF THE INVENTION

The aquarium provided by the present invention generally includes a lower hollow body which defines a lower chamber and an upper hollow body which defines an upper chamber. A mount plate is removably mounted in a bottom of the lower chamber and a waterproof housing is provided on the mount plate to receive a pump therein.

The upper hollow body includes a plate and a housing projecting upward from the plate to define the upper chamber. A water inlet is formed in the plate beyond the housing, through which water is inputted into the lower chamber. An air passage is formed in an upper wall of the housing. A float is movably provided to the housing to block the air passage for isolating the upper chamber unless the float is raised. A protrusion projects upward from the upper wall of the housing, defining a cavity above the upper chamber.

An inlet pipe has a lower end attached to the motor and an upper end extending into the cavity defined by the protrusion, preventing water from entering into the inlet pipe. Air generated by the motor is released into water in the aquarium via an outlet means.

In operation, the water level is initially at a level in the lower chamber. The pump sucks air from the upper end of the inlet pipe which is located in the cavity. The water level in the upper chamber becomes higher and higher as the pressure in the upper chamber gradually decreases. When the water level contacts the float and pushes it upward, the air passage is opened such that the upper chamber communicates with the environment, the water level is accordingly lowered. Thereafter, the float falls and again isolates the upper chamber. The water level again goes higher until it again lifts the float, thus creating a fluctuating water level for viewing purpose.

Other objects, advantages, and novel features of the invention will become more apparent from the following detailed description when taken in conjunction with the accompanying drawings.

BRIEF DESCRIPTION OF THE DRAWINGS

FIGS. 2 through 4 are cross-sectional views illustrating the fluctuation of the water levels in the aquarium.

DESCRIPTION OF THE PREFERRED EMBODIMENT

Figure 1:
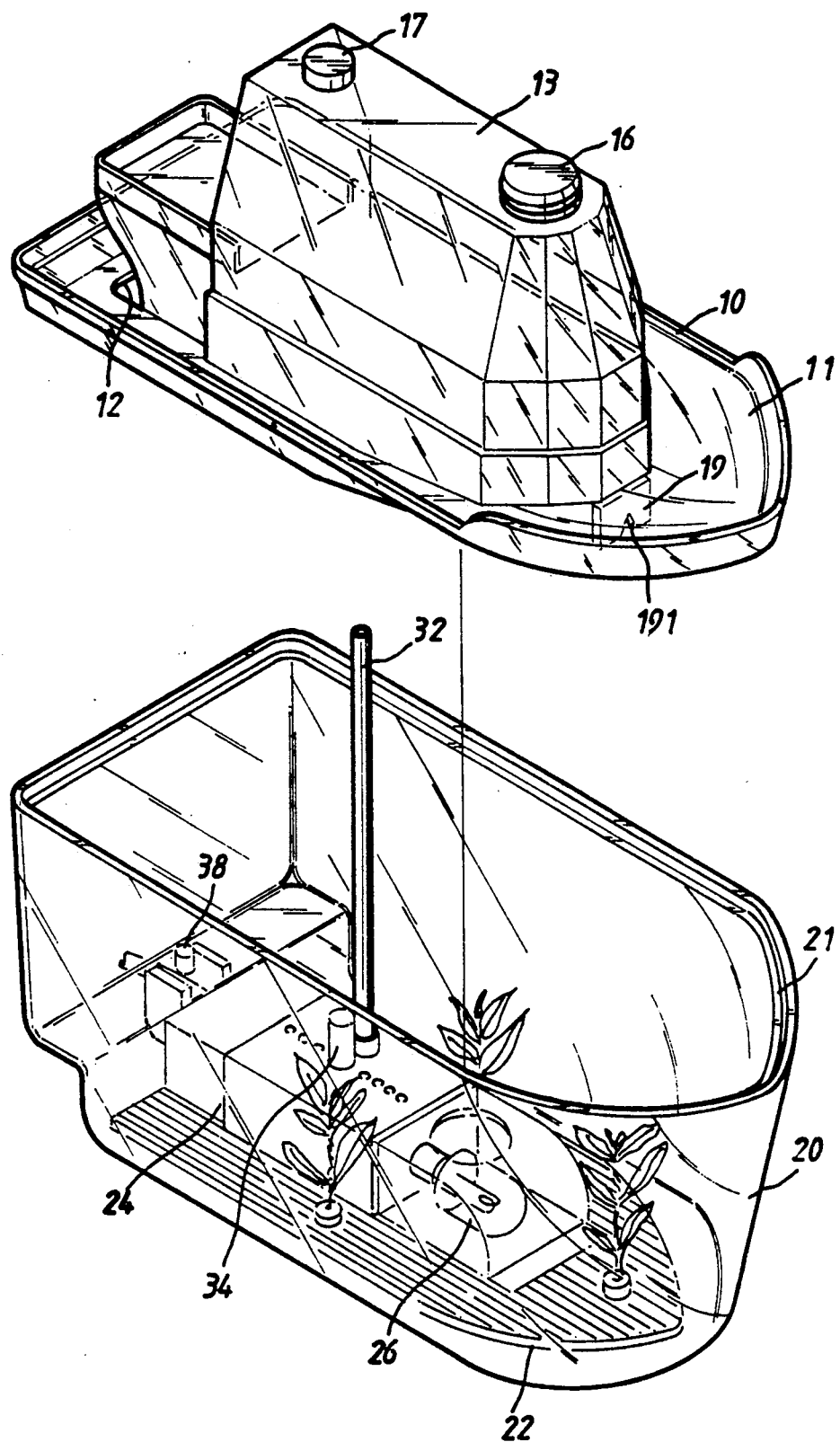
FIG. 1 is an exploded view of a double-layer aquarium in accordance with the present invention.
Figure 2:
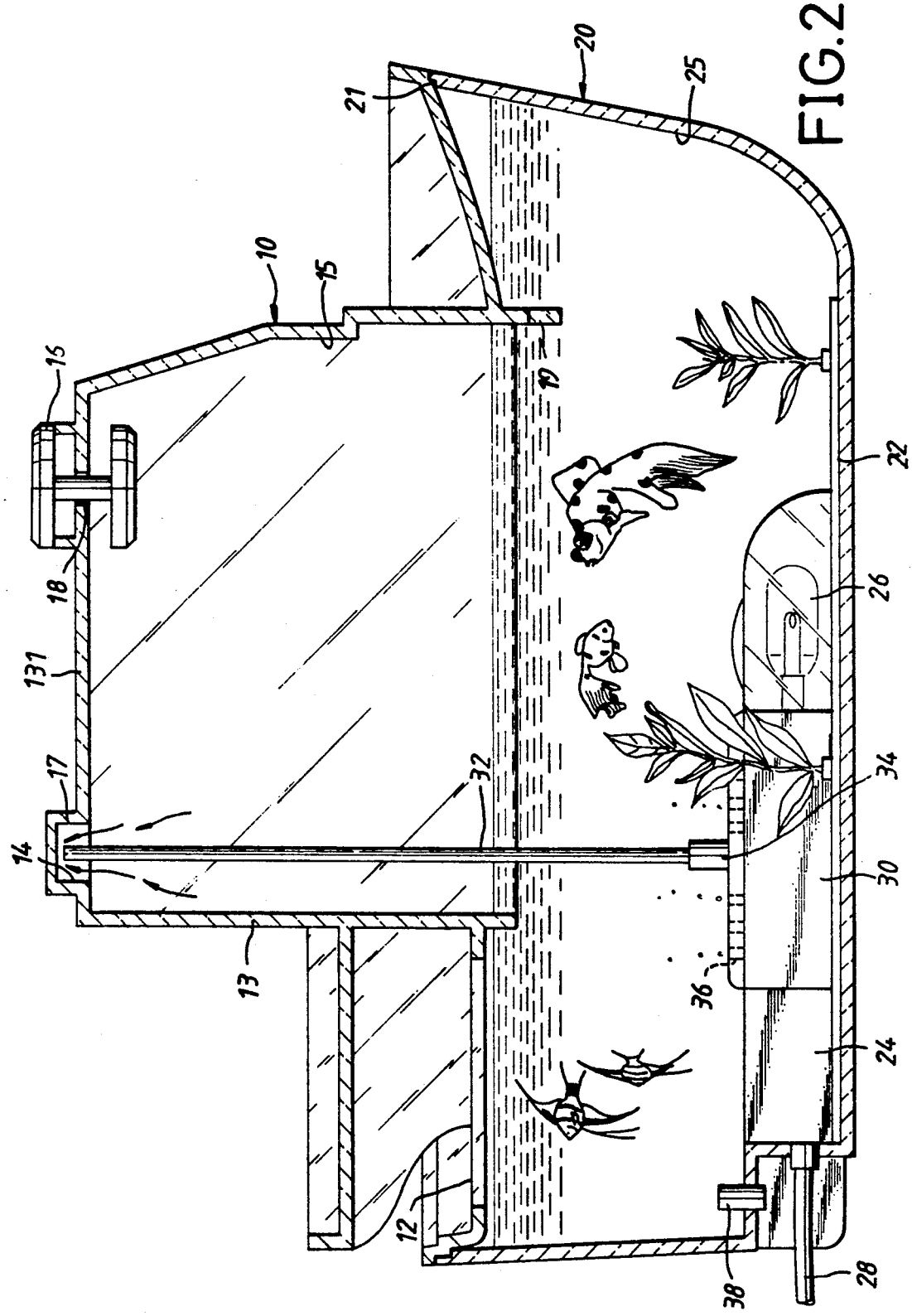

Referring to FIGS. 1 and 2, an aquarium provided by the present invention generally includes a lower hollow body 20 which defines a lower chamber 25 and an upper hollow body 10 which is mounted above the lower hollow body 20 and defines an upper chamber 15. The lower hollow body 20 has a flange 21 extending along an upper edge of an inner periphery thereof to fittingly receive the upper hollow body 10. As shown in FIG. 2, the upper hollow body 10 includes a plate 11 from which a housing 13 projects upward to define the upper chamber 15. Beyond the housing 13, a water inlet 12 is formed in the plate 11 through which water may be inputted into the lower chamber 25. An air passage 18 is formed in an upper wall 131 of the housing 13 and an I-shaped float 16 is movably provided to the housing 13 to block the air passage 18 for isolating the upper chamber 15 unless the float 16 is lifted by water. A protrusion 17 projects upward from the upper wall 131 of the housing 13, defining a cavity 14 above the upper chamber 15.

A mount plate 22 is removably mounted in the bottom of the lower chamber 25. A waterproof housing 24 is provided on the mount plate 22 to receive a pump motor 30 therein. The motor 30 sucks air from an inlet pipe 32 which extends into the cavity 14 defined by the protrusion 14, preventing water from entering into the inlet pipe 32. Air bubbles, which are a necessity to fishes, are generated by the motor 30 and are released into the water via an outlet pipe 34 and a plurality of apertures 36. Preferably, a light bulb 26, controlled by a switch (not shown), may be provided in the waterproof housing 24 to illuminate the aquarium. As usual, a wire 28 affording electricity to the motor 30 and the light bulb 26 is installed. A water release valve 38 is provided to the lower chamber 25 to drain water when desired.

Referring now to FIGS. 2 through 4, in operation, the water level is initially at a level shown in FIG. 2, the motor 30 sucks air from the upper end of the inlet pipe 32 which is located in the cavity 14. As shown in FIG. 3, the water level in the upper chamber 15 becomes higher and higher as the pressure in the upper chamber 15 gradually decreases (the air was drawn from the inlet pipe 32) while the atmospheric pressure acts on the water in the lower chamber 25. As shown in FIG. 4, when the water level contacts the float 16 and pushes it upward, the air passage 18 is opened such that the upper chamber 15 communicates with the environment and the water level is accordingly lowered. Thereafter, the float 16 falls and again isolates the upper chamber 15. The water level again goes higher until it again lifts the float 16, thus creating a fluctuating water level for viewing purpose. It is appreciated that the provision of the apertures 36 through which the air bubbles exits prevents dramatic change in the water level.

Another feature of the invention is that a block 19 with a water passage 191 projects downward from the plate 11, whose purpose is explained below. After a certain period of time, a certain amount of water in the aquarium evaporates, which means that the water level may not reach sufficiently high to actuate the float, nonetheless, the pressure in the upper chamber 15 is still decreasing. If water is not timely supplied, undesired big bubbles which may affect the fishes in the aquarium possibly appear due to the considerable pressure difference. Although the float 16 still cannot be actuated, provision of the water passage 191 allows the air bubbles generated by the motor 30 to circulate into the upper chamber 15, thereby preventing formation of undesired big bubbles.

Although the invention has been explained in relation to its preferred embodiment, it is to be understood that many other possible modifications and variations can be made without departing from the spirit and scope of the invention as hereinafter claimed.

I claim:

1. An aquarium comprising:

a lower hollow body defining a lower chamber, a mount plate being removably mounted in a bottom of the lower chamber, a waterproof housing is provided on the mount plate to receive a motor therein;

an upper hollow body mounted above the lower hollow body, including a plate and a housing projecting upward from the plate to define an upper chamber, a water inlet being formed in the plate beyond the housing, through which water is inputted into the lower chamber, an air passage being formed in an upper wall of the housing, a float being movably provided to the housing to block the air passage for isolating the upper chamber unless the float is raised, a protrusion projecting upward from the upper wall of the housing, defining a cavity above the upper chamber; and an inlet pipe having a lower end attached to the pump and an upper end extending into the cavity defined by the protrusion, preventing water from entering into the inlet pipe, and outlet means through which air generated by the pump is released into water in the aquarium.

* * * * *